(12) United States Patent
Nakakita et al.

(10) Patent No.: US 12,266,943 B2
(45) Date of Patent: Apr. 1, 2025

(54) COMMAND GENERATION DEVICE AND COMMAND GENERATION METHOD IN MULTIPLE POWER GENERATION POWER SUPPLY SYSTEM

(71) Applicant: MITSUBISHI HEAVY INDUSTRIES ENGINE & TURBOCHARGER, LTD., Sagamihara (JP)

(72) Inventors: Osamu Nakakita, Sagamihara (JP); Masayuki Tanaka, Sagamihara (JP); Hiroyuki Suzuki, Sagamihara (JP); Hirotaka Uehara, Sagamihara (JP); Masato Mitsuhashi, Tokyo (JP); Fujio Eguchi, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 637 days.

(21) Appl. No.: 17/426,560

(22) PCT Filed: Aug. 29, 2019

(86) PCT No.: PCT/JP2019/033843
§ 371 (c)(1),
(2) Date: Jul. 28, 2021

(87) PCT Pub. No.: WO2020/158027
PCT Pub. Date: Aug. 6, 2020

(65) Prior Publication Data
US 2022/0109306 A1 Apr. 7, 2022

(30) Foreign Application Priority Data
Feb. 1, 2019 (JP) .................................. 2019-017468

(51) Int. Cl.
*H02J 3/46* (2006.01)
*G05B 17/02* (2006.01)
(Continued)

(52) U.S. Cl.
CPC ................ *H02J 3/46* (2013.01); *G05B 17/02* (2013.01); *H02J 3/16* (2013.01); *H02J 3/40* (2013.01);
(Continued)

(58) Field of Classification Search
CPC ..... G05B 17/02; H02J 3/46; H02J 3/16; H02J 2207/20; H02J 2203/20
See application file for complete search history.

(56) References Cited

U.S. PATENT DOCUMENTS

| 11,650,614 | B2 * | 5/2023 | Vestesen | H02J 3/388 700/295 |
| 2008/0122518 | A1 | 5/2008 | Besser et al. | |

(Continued)

FOREIGN PATENT DOCUMENTS

| CN | 107565599 A | 1/2018 |
| CN | 107968591 A | 4/2018 |

(Continued)

OTHER PUBLICATIONS

International Search Report for International Application No. PCT/JP2019/033843, dated Oct. 21, 2019, with an English translation.
(Continued)

*Primary Examiner* — Vincent H Tran
(74) *Attorney, Agent, or Firm* — Birch, Stewart, Kolasch & Birch, LLP (57) ABSTRACT

A processing unit of a command generation device which is provided separately from a general-purpose inverter, performs following processing. A rotation calculation unit calculates a value relating to a rotation of a rotor of a virtual (Continued)

power generator when the virtual power generator is driven according to an active power command based on a rotor model that simulates a driving of the virtual power generator and calculates a value relating to the rotation of the rotor of the virtual power generator and an active power command. A target determination unit determines a target value of a voltage frequency and a target value of an active power based on the calculated value relating to the rotation. A command generation unit generates a control command for the inverter based on the determined target value of the voltage frequency and the target value of the active power. A time constant relating to a synchronization power of the rotor model matches a time constant relating to a synchronization power of the AC power generator.

13 Claims, 7 Drawing Sheets

(51) Int. Cl.
*H02J 3/16* (2006.01)
*H02J 3/40* (2006.01)

(52) U.S. Cl.
CPC ....... *H02J 2203/20* (2020.01); *H02J 2207/20* (2020.01); *H02J 2300/22* (2020.01)

(56) References Cited

U.S. PATENT DOCUMENTS

| | | | |
|---|---|---|---|
| 2012/0143385 A1* | 6/2012 | Goldsmith | H02J 3/466 700/297 |
| 2013/0041516 A1* | 2/2013 | Rockenfeller | H02J 3/38 700/287 |
| 2013/0300118 A1 | 11/2013 | Bech | |
| 2014/0214230 A1 | 7/2014 | Gurudasani et al. | |
| 2015/0180393 A1* | 6/2015 | Tesch | H02P 9/007 322/29 |
| 2016/0006338 A1* | 1/2016 | Sakimoto | H02M 7/53875 363/131 |
| 2017/0047861 A1* | 2/2017 | Sakimoto | H02M 7/5395 |
| 2019/0072073 A1* | 3/2019 | Wagoner | G05B 19/02 |
| 2020/0083709 A1* | 3/2020 | Umezu | H02P 9/00 |
| 2020/0212823 A1* | 7/2020 | Gong | H02J 3/381 |
| 2021/0194383 A1* | 6/2021 | Tsuruma | H02J 3/38 |

FOREIGN PATENT DOCUMENTS

| | | | |
|---|---|---|---|
| JP | 2007-20361 A | | 1/2007 |
| JP | 2007-244068 A | | 9/2007 |
| JP | 2009-81942 A | | 4/2009 |
| JP | 2009-225599 A | | 10/2009 |
| JP | 2011-055591 A | | 3/2011 |
| JP | 2011-67078 A | | 3/2011 |
| JP | 2011-120406 A | | 6/2011 |
| JP | 2015-211617 A | | 11/2015 |
| JP | 2016010252 A | * | 1/2016 |
| JP | 2017-192166 A | | 10/2017 |
| JP | 2017-208932 A | | 11/2017 |
| JP | 2018-107959 A | | 7/2018 |
| JP | 2019-003454 A | | 1/2019 |
| WO | WO 2012/081174 A1 | | 6/2012 |
| WO | WO 2016/185660 A1 | | 11/2016 |
| WO | WO 2018/122726 A1 | | 7/2018 |
| WO | WO-2018124221 A1 * | | 7/2018 ............... H02J 3/04 |

OTHER PUBLICATIONS

Written Opinion of the International Searching Authority for International Application No. PCT/JP2019/033843, dated Oct. 21, 2019, with an English translation.

Hirase et al., "A Novel Control Approach for Virtual Synchronous Generators to Suppress Frequency and Voltage Fluctuations in Microgrids," Applied Energy, Elsevier, vol. 210, Jul. 5, 2017, pp. 699-710.

* cited by examiner

COMMAND GENERATION DEVICE AND COMMAND GENERATION METHOD IN MULTIPLE POWER GENERATION POWER SUPPLY SYSTEM

TECHNICAL FIELD

The present invention relates to a command generation device and a command generation method that generate a control command for an inverter of a DC power supply device of a multiple power generation power supply system in an off grid independent operation.

Priority is claimed on Japanese Patent Application No. 2019-017468, filed Feb. 1, 2019, the content of which is incorporated herein by reference.

BACKGROUND ART

Patent Document 1 discloses a distributed power supply system including multiple power generators that perform a grid-connected operation or an off grid independent operation. According to Patent Document 1, in the distributed power supply system, one power generator performs a rotation speed control by isochronous characteristics, and the remaining power generators perform the rotation speed control by droop characteristics during the off grid independent operation.

CITATION LIST

Patent Document

[Patent Document 1]
  Japanese Unexamined Patent Application, First Publication No. 2009-081942

SUMMARY OF INVENTION

Technical Problem

Incidentally, a power supply system is known, in which a combination of a DC power supply device such as an electricity storage device or a renewable energy power generation device and an inverter (power conditioner) is connected to a bus provided with an AC power generator that operates autonomously. The AC power generator performs a rotation speed control by droop characteristics. However, when a power supply system having an AC power generator is operated autonomously, the frequency of bus voltage tends to fluctuate due to a fluctuation of a load. Therefore, when the voltage frequency of the AC power generator fluctuates, the inverter is likely to be disconnected from the linked state.

An object of the present invention is to provide an inverter, an inverter control device, an inverter control method, and a program that can suppress the occurrence of disconnection of the DC power supply device due to the fluctuation of the load, in a power supply system including an AC power generator and a DC power supply device.

Solution to Problem

According to a first aspect of the present invention, a command generation device is a device that generates a control command for an inverter of a DC power supply device, the inverter being provided separately from the command generation device, the DC power supply device being connected to the same bus as that of an AC power generator that supplies electric power by an off grid independent operation. The device includes: a rotation calculation unit configured to calculate, based on a rotor model and an active power command, a value relating to a rotation of a rotor of a virtual power generator when the virtual power generator is driven according to the active power command, wherein the rotor model is configured to simulate a driving of the virtual power generator and to calculate a value relating to the rotation of the rotor of the virtual power generator; a target determination unit configured to determine a target value of a voltage frequency and a target value of an active power based on the calculated value relating to the rotation; and a command generation unit configured to generate a control command for the inverter based on the determined target value of the voltage frequency and the target value of the active power. A time constant relating to a synchronization power of the rotor model matches a time constant relating to a synchronization power of the AC power generator.

According to a second aspect of the present invention, the command generation device according to the first aspect may further include a drive torque calculation unit configured to calculate a value relating to a drive torque of the virtual power generator by inputting the voltage frequency of the bus, the frequency command for the inverter, and the active power command into a governor model, wherein the governor model is configured to determine a value relating to the drive torque of the virtual power generator based on the active voltage of the bus, the frequency command, and the active power command. The rotation calculation unit may be configured to calculate the value relating to the rotation of the virtual power generator based on the calculated value relating to the drive torque and the rotor model.

According to a third aspect of the present invention, in the command generation device according to the first aspect, a time constant relating to a droop filter of the governor model may match a time constant relating to the droop filter of a governor of the AC power generator.

According to a fourth aspect of the present invention, the command generation device according to the first to third aspects may further include a field voltage calculation unit configured to calculate a value relating to a field voltage of the virtual power generator by inputting the bus voltage and reactive power command for the inverter into an automatic voltage regulator model, wherein the automatic voltage regulator model is configured to determine a value relating to the field voltage of the virtual power generator based on the bus voltage and the reactive power command. The target determination unit may be configured to determine the target values of the active power and reactive power based on the calculated value relating to the rotation and the value relating to the field voltage.

According to a fifth aspect of the present invention, a command generation device generates a control command for an inverter of a DC power supply device, the inverter being provided separately from the command generation device, the DC power supply device being connected to the same bus as that of an AC power generator that supplies electric power by an off grid independent operation. The device includes: a target determination unit configured to determine a target value of active power based on a voltage value of the bus, wherein the target value of active power decreases monotonically with respect to a voltage value; and a command generation unit configured to generate a control command for the inverter based on the determined target value of the voltage frequency and the target value of the active power.

According to a sixth aspect of the present invention, in the control device for the inverter according to the fifth aspect, the target determination unit may be configured to determine a target value of a voltage frequency that increases monotonically with respect to the voltage value, and may determine the target value of the active power based on an active power droop function and the determined target value of the voltage frequency, the active power droop function indicating a relationship in which the active power monotonically decreases with respect to the voltage frequency.

According to a seventh aspect of the present invention, in the control device for the inverter according to the sixth aspect, an amount of change of the active power with respect to the voltage frequency in the active power droop function may match active power droop characteristics of the AC power generator.

According to an eighth aspect of the present invention, in the control device of the inverter according to any one of the fifth to seventh aspects, the target determination unit may be configured to determine the target value of the reactive power that monotonically decreases with respect to the voltage value based on the voltage value of the bus, and the command generation unit may be configured to generate a control command for the inverter based on the determined target value of the voltage frequency, the target value of the active power, and the target value of the reactive power.

According to a ninth aspect of the present invention, in the control device for the inverter according to the eighth aspect, the target determination unit may be configured to determine the target value of the reactive power based on a reactive power droop function indicating a relationship in which the reactive power monotonically decreases with respect to the voltage value and the determined voltage value of the bus.

According to a tenth aspect of the present invention, in the control device for the inverter according to the ninth aspect, an intercept of the voltage value and an intercept of the reactive power in the reactive power droop function may be equal to or less than an intercept of the voltage value and an intercept of the reactive power in the reactive power droop characteristics of the AC power generator.

According to an eleventh aspect of the present invention, a command generation method is a method of generating a control command for an inverter of a DC power supply device, the inverter being connected to the same bus as that of an AC power generator that supplies electric power by an off grid independent operation. The method includes: a step of calculating, based on a rotor model and an active power command, a value relating to a rotation of a rotor of a virtual power generator when the virtual power generator is driven according to the active power command, wherein the rotor model is configured to simulate a driving of the virtual power generator and to calculate a value relating to the rotation of the rotor of the virtual power generator; a step of determining a target value of a voltage frequency and a target value of an active power based on the calculated value relating to the rotation; and a step of generating a control command for the inverter based on the determined target value of the voltage frequency and the target value of the active power. A time constant relating to a synchronization power of the rotor model matches a time constant relating to a synchronization power of the AC power generator.

According to a twelfth aspect of the present invention, a command generation method is a method of generating a control command for an inverter of DC power supply device, the inverter being connected to the same bus as that of an AC power generator that supplies electric power by an off grid independent operation. The method includes: a step of determining a target value of the voltage frequency that increases monotonically with respect to the voltage value and a target value of the active power that decreases monotonically with respect to the voltage value based on the voltage value of the bus; and a step of generating a control command for the inverter based on the determined target value of the voltage frequency and the target value of the active power.

Advantageous Effects of Invention

According to the present invention, a command generation device according to at least one of the above-described aspects can control an inverter such that the fluctuation of the load is shared by each of the AC power generator and the DC power supply device in the power supply system including the AC power generator and the DC power supply device.

DESCRIPTION OF EMBODIMENTS

First Embodiment

Figure 1:
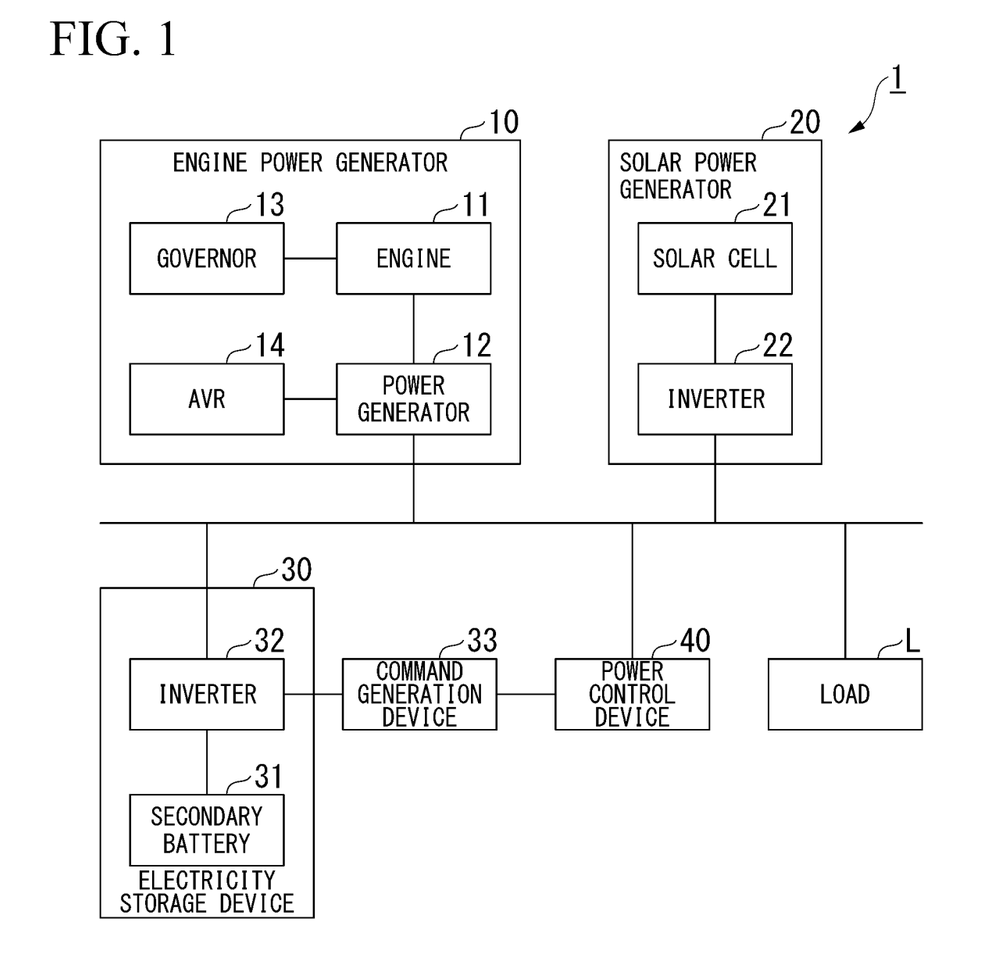
FIG. 1 is a schematic block diagram showing a configuration of a power supply system according to a first embodiment.

FIG. 1 is a schematic block diagram showing a configuration of a power supply system according to a first embodiment.

<<Configuration of Power Supply System>>

A power supply system 1 according to a first embodiment includes an engine power generator 10, a solar power generator 20, an electricity storage device 30, a command generation device 33, and a power control device 40. The power supply system 1 supplies electric power to a load L by an off grid independent operation. That is, the power supply system 1 is a so-called micro-grid system or an off-grid system. The engine power generator 10, the solar power generator 20, and the electricity storage device 30 are connected to a bus and supply the power to the load L via the bus.

The engine power generator 10 includes an engine 11, a power generator 12, a governor 13, and an automatic voltage regulator (AVR) 14. The engine power generator 10 is an AC power generator that generates AC power by driving the power generator 12 by rotating the engine 11.

The governor 13 controls a rotation speed of the engine 11 by the Hz-kW droop characteristic. The governor characteristic of the engine power generator 10 is represented, for example, by a slope of a linear function connecting plots relating to a rated output and a rated frequency and plots relating to a set frequency that is set in a no-load state when the load is cut off from the zero output and the rated output. That is, the Hz-kW droop characteristic is a characteristic in which the output decreases as the frequency increases. In other embodiments, the governor characteristic may be realized by a proportional integral differential (PID) control. The AVR 14 controls a current supplied to field winding of the power generator 12 by the V-kVar droop characteristic to adjust a terminal voltage of the power generator 12. The V-kVar droop characteristic is a characteristic in which a reactive power decreases as the voltage increases. In other embodiments, another AC power generator may be used instead of the engine power generator 10.

The solar power generator 20 includes a solar cell 21 and an inverter 22. The solar cell 21 is a DC power supply device that converts sunlight into DC power. The inverter 22 converts the DC power generated by the solar cell 21 into AC power. The inverter 22 and the solar cell 21 do not necessarily need to be provided in pair. For example, some solar cells 21 may be connected to one inverter 22. In other embodiments, other renewable energy power generators such as wind power generators may be used instead of the solar cell 21.

The electricity storage device 30 includes a secondary battery 31 and an inverter 32. The inverter 32 converts the DC power output from the secondary battery 31 into AC power and supplies the AC power to the bus based on the command from the command generation device 33. In addition, the inverter 32 converts a part of the AC power flowing through the bus into the DC power based on the command from the power control device 40, and charges the secondary battery 31. As the secondary battery 31, for example, a lithium ion secondary battery can be used. The inverter 32 is a general-purpose inverter is operated according to a control command relating to P-Q control. The inverter 32 according to other embodiments may be operated according to a control command relating to a target value of the apparent power, a target value of a power factor angle, and a target value of a voltage frequency.

The inverter 32 and the secondary battery 31 do not necessarily need to be provided in pair. For example, some secondary batteries 31 may be connected to one inverter 32.

The command generation device 33 generates a control command for controlling the inverter 32 based on the command from the power control device 40, and outputs the control command to the inverter 32. The control command for the inverter 32 includes a target value of the active power, a target value of the reactive power, and a target value of the voltage frequency. The command generation device 33 is provided separately from the inverter 32.

The power control device 40 monitors a value of power in the bus, outputs a power generation command to the engine power generator 10, and outputs a charge and discharge command to the electricity storage device 30. For example, the power control device 40 outputs a power generation command to the engine power generator 10 to reduce or stop the power generation when the power generated by the solar power generator 20 is equal to or more than a predetermined threshold value, such as in the daytime. In addition, the power control device 40 outputs a power generation command for increasing the power generation to the engine power generator 10 when the power generated by the solar power generator 20 is less than the predetermined threshold value such as at night or in bad weather.

In addition, for example, the power control device 40 outputs the charge and discharge command for smoothing the fluctuation of the power generation by the solar power generator 20 to the inverter 32 through processing performed by the command generation device 33. In addition, the power control device 40 compares the sum of the value of power supplied to the bus with a demand value of power by the load L, and outputs the charge and discharge command to the inverter 32 based on a power difference through processing performed by the command generation device 33.

<<Configuration of Command Generation Device>>

Figure 2:
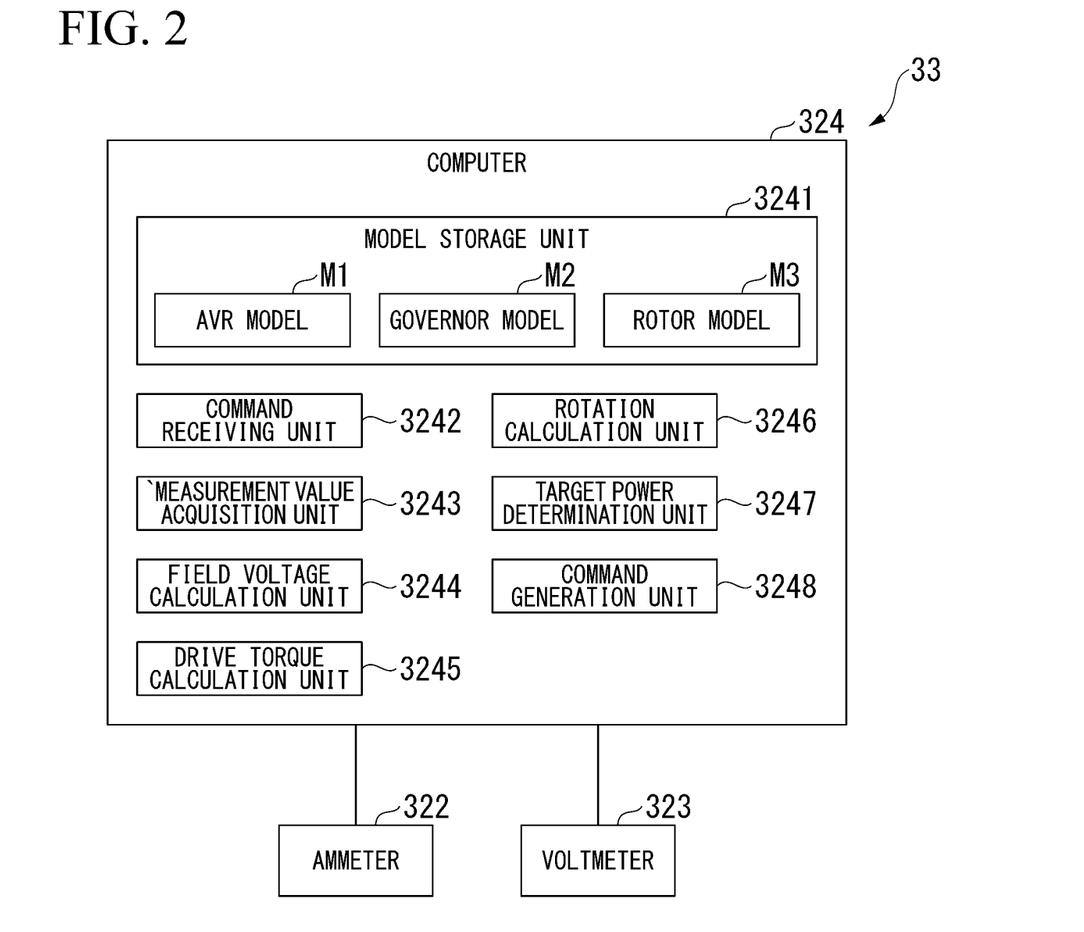
FIG. 2 is a schematic block diagram showing a configuration of a command generation device according to the first embodiment.

FIG. 2 is a schematic block diagram showing a configuration of the command generation device according to the first embodiment.

The command generation device 33 according to the first embodiment includes an ammeter 322, a voltmeter 323, and a computer 324. The ammeter 322 measures the current at an output end of the inverter 32. The voltmeter 323 measures the voltage at the output end of the inverter 32. The computer 324 generates a control command based on measurement values by the ammeter 322 and the voltmeter 323.

The computer 324 includes a model storage unit 3241, a command receiving unit 3242, a measurement value acquisition unit 3243, a field voltage calculation unit 3244, a drive torque calculation unit 3245, a rotation calculation unit 3246, a target determination unit 3247, and a command generation unit 3248.

The model storage unit 3241 stores a mathematical model that simulates a behavior of a virtual power generator. Specifically, the model storage unit 3241 stores an AVR model M1 that simulates the behavior of the AVR of the virtual power generator, a governor model M2 that simulates the behavior of the governor of the virtual power generator, and a rotor model M3 that simulates the behavior of the rotor of the virtual power generator. The AVR model M1 outputs the field voltage and the electric torque of the virtual power generator by inputting the measurement value of the reactive power, the reactive power command value, the effective voltage value, and the voltage command value. The governor model M2 outputs a drive torque value of the virtual power generator by inputting a measurement value of the active power, an active power command value, an angular velocity of the rotor of the virtual power generator, and an angular velocity command value. The rotor model M3 outputs an angular velocity and phase angle of the rotor of the virtual power generator by inputting an electric torque value and the drive torque value of the virtual power generator. Details of each mathematical model will be described later.

The command receiving unit 3242 receives the charge and discharge command from the power control device 40. The discharge command includes an active power command value, a reactive power command value, a voltage command value, and an angular velocity command value.

The measurement value acquisition unit 3243 acquires the measurement values by the ammeter 322 and the voltmeter 323. In addition, the measurement value acquisition unit 3243 calculates a voltage value and a current value that contribute to the active power, a voltage value and a current value that contribute to the reactive power, an effective voltage value, an active power value, and a reactive power value based on the measurement values by the ammeter 322 and the voltmeter 323 and the phase angle of the rotor of the virtual power generator.

The field voltage calculation unit 3244 inputs the reactive power command value and the voltage command value received by the command receiving unit 3242, and the reactive power value and effective voltage value acquired by the measurement value acquisition unit 3243 into the AVR model M1 to calculate a field voltage value and an electric torque value of the virtual power generator. The field voltage value and the electric torque value of the virtual power generator are examples of the values relating to the field voltage of the virtual power generator.

The drive torque calculation unit 3245 inputs the active power command value and the angular velocity command value received by the command receiving unit 3242, the measurement value of the active power acquired by the measurement value acquisition unit 3243, and the angular velocity of the rotor of the virtual power generator calculated by the rotation calculation unit 3246 in the previous control to the governor model M2, to calculate the drive torque value of the virtual power generator. The drive torque value is an example of a value relating to the drive torque of the virtual power generator.

The rotation calculation unit 3246 inputs the electric torque value calculated by the field voltage calculation unit 3244 and the drive torque value calculated by the drive torque calculation unit 3245 to the rotor model M3, to calculate the angular velocity and the phase angle of the rotor of the virtual power generator. The angular velocity and the phase angle of the rotor of the virtual power generator are examples of values relating to the rotation of the rotor of the virtual power generator.

The target determination unit 3247 determines the target value of the active power and the target value of the reactive power based on the field voltage value calculated by the field voltage calculation unit 3244, the voltage value and the current value that contribute to the active power acquired by the measurement value acquisition unit 3243 and the voltage value and the current value that contribute to the reactive power, and the phase angle of the rotor calculated by the rotation calculation unit 3246. The target determination unit 3247 determines the target value of the voltage frequency based on the angular velocity of the rotor of the virtual power generator.

The command generation unit 3248 generates a control command for the inverter 32 based on the target value of the active power, the target value of the reactive power, and the target value of the voltage frequency determined by the target determination unit 3247. The command generation unit 3248 outputs the generated control command to the inverter 32.

<<Configuration of Mathematical Model>>

Figure 3:
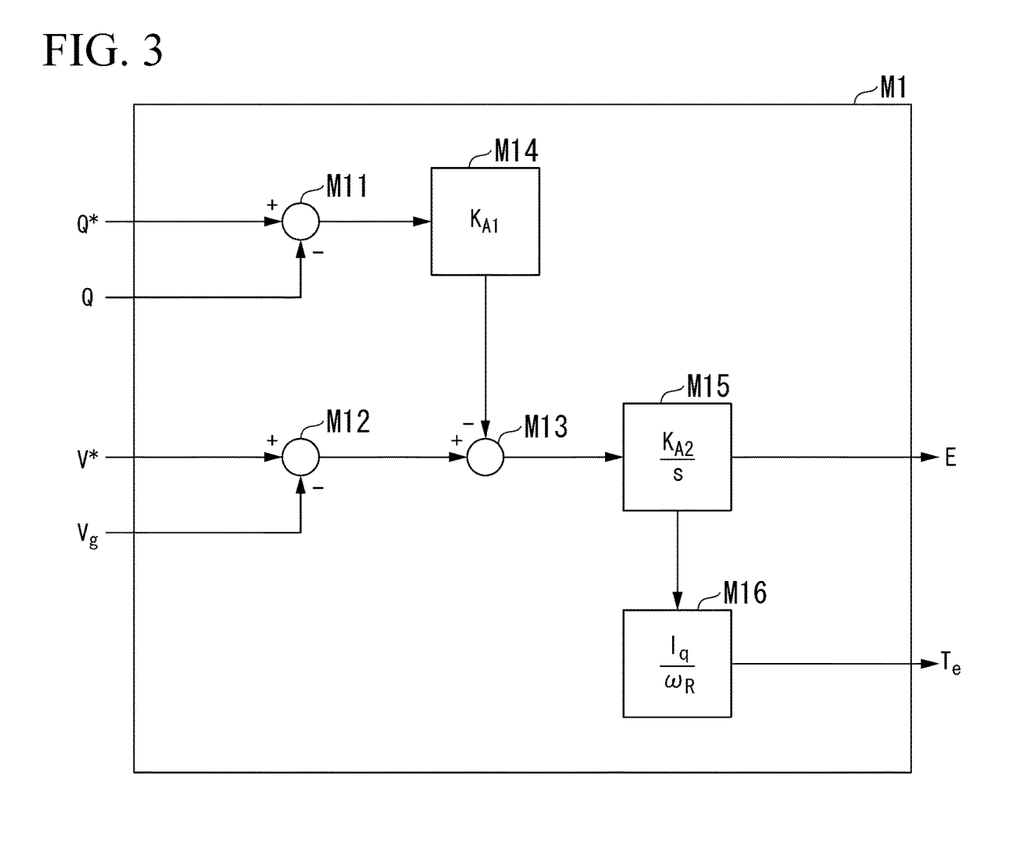
FIG. 3 is a block line diagram showing an example of an AVR model according to the first embodiment.

FIG. 3 is a block line diagram showing an example of the AVR model according to the first embodiment.

By inputting the measurement value Q of the reactive power, the reactive power command value Q*, the effective voltage value $V_g$, and the voltage command value V*, the AVR model M1 output the field voltage value E and the electric torque value $T_e$ of the virtual power generator. Specifically, the AVR model M1 includes addition points M11, M12, and M13, a P block M14, an I block M15, and a P block M16. At the addition point M11 obtains a difference between the measurement value Q of the reactive power and the reactive power command value Q*. The P block M14 performs a P control on the output of the addition point M11 by a proportional gain $K_{A1}$. The proportional gain $K_{A1}$ corresponds to a V-kVar droop gain of the virtual power generator. The addition point M12 obtains a difference between the effective voltage value $V_g$ and the voltage command value V*. The addition point M13 obtains a difference between the output of the addition point M12 and the output of the P block M14. The I block M15 performs an integral control on the output of the addition point M13 by an integral gain $K_{A2}$ to obtain the field voltage value E. The P block M16 multiplies the field voltage value E by the invalid current value $I_q$ and divides the result by the angular velocity $\omega_R$ of the rotor to obtain the electric torque $T_e$ of the virtual power generator.

Figure 4:
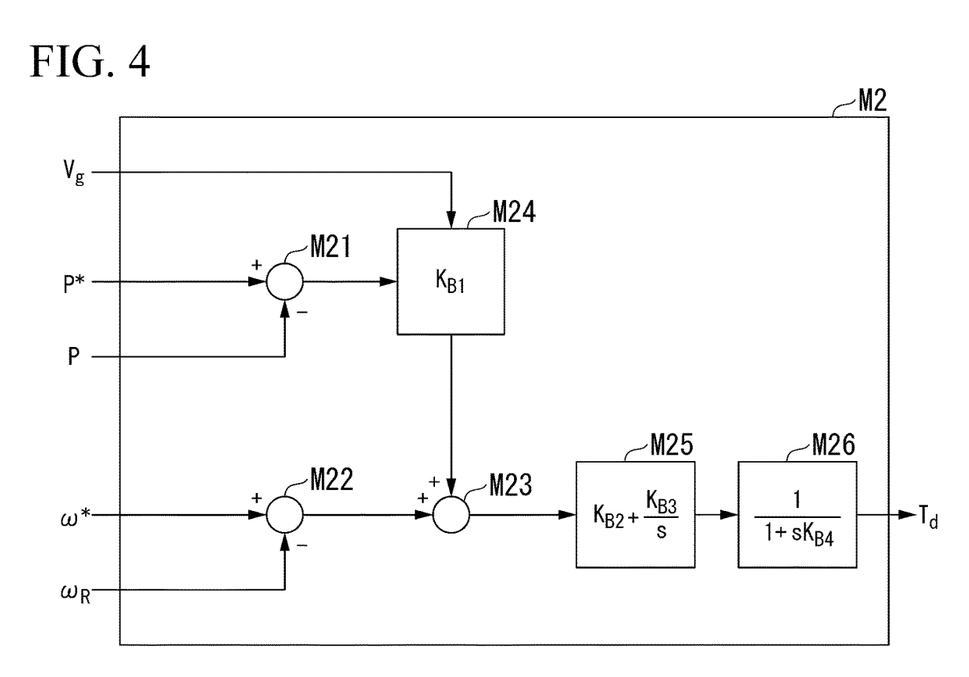
FIG. 4 is a block line diagram showing an example of a governor model according to the first embodiment.

FIG. 4 is a block line diagram showing an example of the governor model according to the first embodiment.

By inputting the measurement value P of the active power, the active power command value P*, the angular velocity $\omega_R$ of the rotor of virtual power generator, and the angular velocity command value ω*, the governor model M2 outputs the drive torque value $T_d$ of the virtual power generator. Specifically, the governor model M2 includes addition points M21, M22, and M23, a P block M24, a PI block M25, and a primary lag block M26. The addition point M21 obtains a difference between the measurement value P of the active power and the active power command value P*. The P block M24 performs a P control on the output of the addition point M21 by a proportional gain $K_{B1}$. The proportional gain $K_{B1}$ corresponds to a Hz-kW droop gain of the virtual power generator. In addition, the proportional gain $K_{B1}$ is determined by a voltage function that monotonically decreases with respect to the effective voltage value $V_g$. Therefore, the P block M24 determines the proportional gain $K_{B1}$ according to the V-kW droop characteristic based on the effective voltage value $V_g$, and calculates the P block M24. The addition point M22 obtains a difference between the angular velocity $\omega_R$ of the rotor and the angular velocity command value ω* of the virtual power generator. The addition point M23 obtains a sum of the output of the addition point M22 and the output of the P block M24. The PI block M25 performs a PI control on the output of the addition point M23 by the proportional gain $K_{B2}$ and the integral gain $K_{B3}$. The primary lag block M26 performs a primary lag control on the output of the PI block M25 by a time constant $K_{B4}$ to obtain a drive torque value $T_d$. The time constant $K_{B4}$ is the same as the time constant of governor 13. In the present specification, "the time constant is the same" and "the time constant matches" do not necessarily mean to be exactly the same, but includes a range of substantially matching (for example, the range of ±3 dB).

Figure 5:
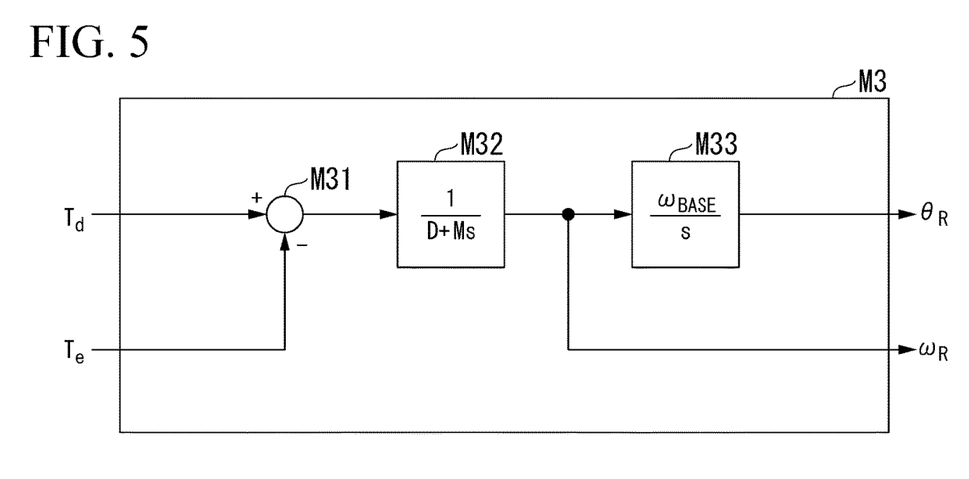
FIG. 5 is a block line diagram showing an example of a rotor model according to the first embodiment.

FIG. 5 is a block line diagram showing an example of the rotor model according to the first embodiment.

By inputting the electric torque value $T_e$ and drive torque value $T_d$ of the virtual power generator, the rotor model M3 outputs the angular velocity $\omega_R$ and the phase angle OR of the rotor of the virtual power generator. Specifically, the rotor model M3 includes an addition point M31, a primary lag block M32, and an I block M33. The addition point M31 obtains a difference between the electric torque $T_e$ and the drive torque $T_d$ of the virtual power generator. The primary lag block M32 performs the primary lag control on the output of the addition point M31 by an integral gain M and a time constant D to obtain an angular velocity $\omega_R$ of the rotor. The time constant D is a braking coefficient relating to a braking force of the braking winding, and is the same as a braking coefficient of the power generator 12. In addition, the integral gain M is a gain corresponding to a moment of inertia of the rotor of the virtual power generator, and is the same as the moment of inertia of the rotor of engine 11. The I block M33 integrates the angular velocity $\omega_R$ of the rotor and multiplies the result by a proportional gain $\omega_{BASE}$ to obtain a phase $\theta_R$ of the rotor of the virtual power generator. The proportional gain $\omega_{BASE}$ is a reference frequency of the bus.

<<Operation>>

With the configuration described above, the computer 324 obtains the rotation angle and the angular velocity of the virtual power generator, and the field voltage value, from the active power command value, the reactive power command value, the voltage command value, the angular velocity command value, and the measurement values by the ammeter 322 and the voltmeter 323, based on the AVR model M1, the governor model M2, and the rotor model M3. The computer 324 determines the target value of the active power, the target value of the reactive power, and the target value of the voltage frequency from the rotation angle and the angular velocity of the virtual power generator, and the field voltage value, and generates the control command for the inverter 32 based on the determined values. The inverter 32 operates according to the control command generated by the command generation device 33, and the characteristics corresponding to the virtual power generator are realized.

Here, the time constant of the virtual power generator according to the present embodiment is the same as the time constant of the engine power generator 10, but the V-kVar droop gain, the Hz-kW droop gain, an impedance, and the like do not necessarily need to be the same as those of the engine power generator 10. For example, by making the Hz-kW droop gain of the virtual power generator slower than the Hz-kW droop gain of the engine power generator 10, a burden of the active power by the inverter 32 due to the fluctuation of the load L can be made larger than that of the engine power generator 10. In addition, for example, by making the V-kVar droop gain of the virtual power generator steeper than the V-kVar droop gain of the engine power generator 10, the burden of the reactive power by the inverter 32 due to the fluctuation of the load L can be made smaller than that of the engine power generator 10.

<<Action and Effects>>

The command generation device 33 according to the first embodiment calculates the angular velocity of the rotor of the virtual power generator using the rotor model M3 having the same time constant relating to the synchronization power as that of the engine power generator 10, determines the target value of the output voltage based on the angular velocity, and then, generates the control command for the inverter 32. As described above, by matching the time constant relating to the synchronization power of the virtual power generator with that of the engine power generator 10, the command generation device 33 can change the voltage frequency of the inverter 32 in accordance with the change of the voltage frequency of the engine power generator 10 when the load L fluctuates. That is, in the power supply system 1, the command generation device 33 according to the first embodiment can prevent the electricity storage device 30 from being disconnected even if the voltage frequency of the engine power generator 10 changes due to the fluctuation of the load L.

The command generation device 33 according to the first embodiment is provided separately from the inverter 32. As a result, by installing the command generation device 33 in the existing electricity storage device 30, it is possible to prevent the electricity storage device 30 from being disconnected without modifying the inverter 32.

In addition, the command generation device 33 according to the first embodiment calculates the angular velocity of the rotor of the virtual power generator using the rotor model M3 having the same time constant relating to the synchronization power as that of the engine power generator 10, determines the target value of the output voltage based on the angular velocity, and then, generates the control command for the inverter 32. As described above, by matching the time constant relating to the synchronization power of the virtual power generator with that of the engine power generator 10, the command generation device 33 can change the output of the inverter 32 in accordance with the change of the output of the engine power generator 10 when the load L fluctuates. That is, in the power supply system 1, the command generation device 33 according to the first embodiment can make the fluctuation of the load L be shared by each of the engine power generator 10 and the electricity storage device 30.

In addition, the command generation device 33 according to the first embodiment calculates the drive torque value of the virtual power generator using the governor model M2. As a result, the command generation device 33 can control the active power of the inverter 32 by the Hz-kW droop characteristic. The command generation device 33 according to other embodiments may determine the drive torque value without depending on the governor model M2. In addition, the time constant of the governor model relating to the droop filter according to the first embodiment is the same as the time constant of the governor 13 of the engine power generator 10 relating to the droop filter. As a result, when the load L fluctuates, the computer 324 can change the output frequency of the inverter 32 in accordance with the change of the output frequency of the engine power generator 10.

In addition, the computer 324 of the inverter 32 according to the first embodiment calculates the field voltage value of the virtual power generator using the AVR model M1. As a result, the computer 324 can control the reactive power of the inverter 32 by the droop characteristic. The computer 324 according to other embodiments may control the reactive power without depending on the AVR model M1.

Modification Example

In the first embodiment, the command generation device 33 generates the control command for the inverter 32 of the electricity storage device 30, but other embodiments are not limited to this. For example, in other embodiments, the command generation device 33 may generate the control command for inverter 22 of the solar power generator 20. In this case, the solar power generator 20 needs to be provided with an electricity storage device capable of absorbing a difference between the generated power amount of the solar cell 21 and the output power amount of the inverter 22 caused by the inertia of the virtual power generator. In addition, in other embodiments, the above-described control may be performed on some of the inverters 32 among the plurality of inverters 32, and the normal control may be performed on the other inverters 32 among the plurality of inverters 32.

In the first embodiment, the rotation calculation unit 3246 calculates the phase and the angular velocity of the rotor as the values relating to the rotation of the rotor, but the present invention is not limited to this. For example, in other embodiments, the rotation calculation unit 3246 may calculate other values such as the rotation frequency and the rotation speed of the rotor. In addition, in the first embodiment, the drive torque calculation unit 3245 calculates the drive torque value as the value relating to the drive torque of the virtual power generator, but the present invention is not limited to this. For example, in other embodiments, the drive torque calculation unit 3245 may calculate other values such as the rotational force of the rotor. In addition, in the first embodiment, the field voltage calculation unit 3244 calculates the field voltage value as the value relating to the field voltage of the virtual power generator, but the present invention is not limited to this. For example, in other embodiments, the field voltage calculation unit 3244 may calculate other values relating to the field current of the virtual power generator.

In addition, in the first embodiment, the calculations are performed using the mathematical model shown in FIG. 3 to FIG. 5, but the present invention is not limited to this. For example, in other embodiments, the calculation may be performed based on the engine power generator 10 represented by a PARK model.

Second Embodiment

The command generation device 33 according to the first embodiment generates the control command for the inverter 32 by simulating the behavior of the virtual power generator. On the other hand, in a second embodiment, the command generation device 33 generates the control command for the inverter 32 without simulating the behavior of the virtual power generator.

<<Configuration of Command Generation Device>>

Figure 6:
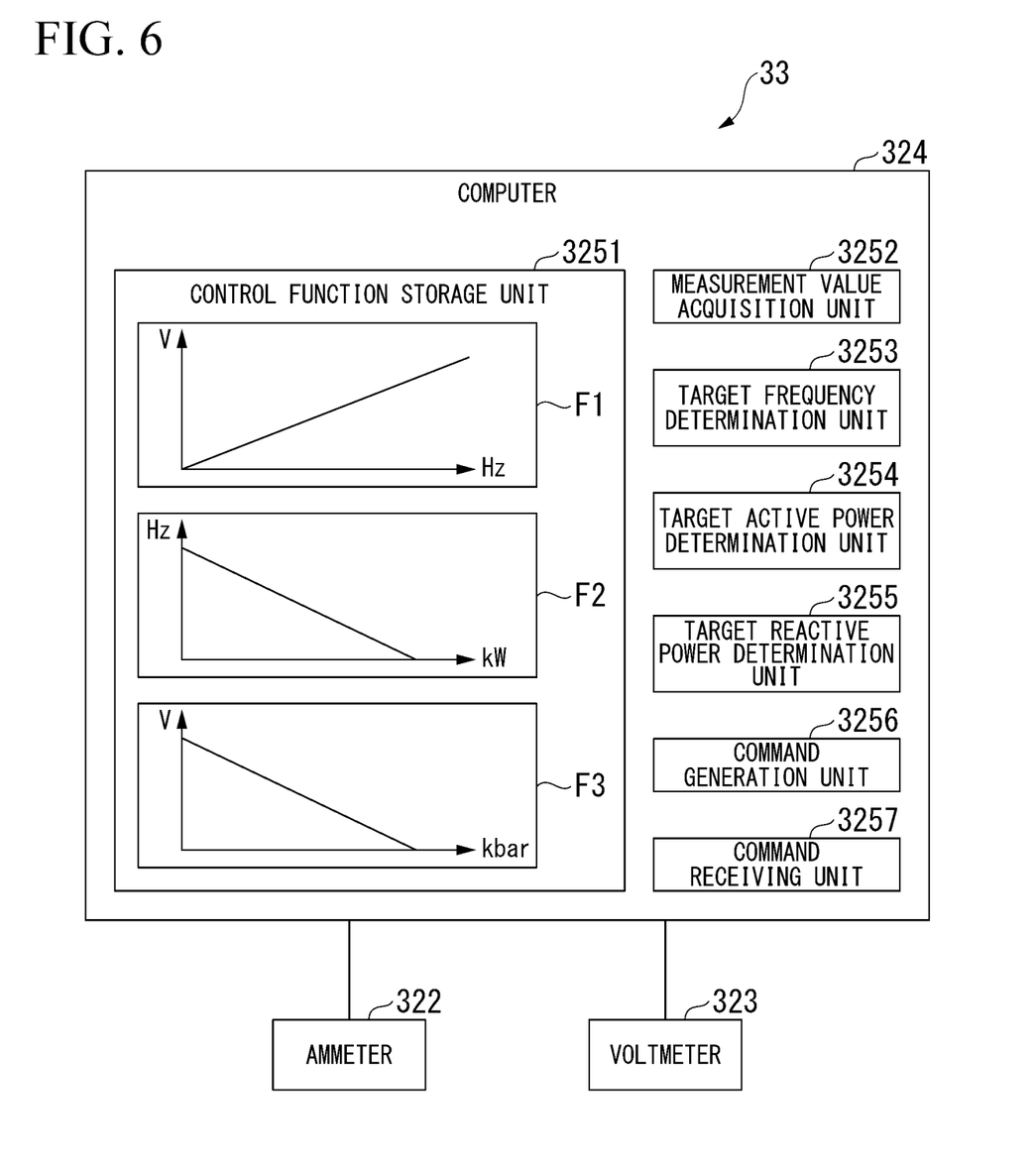
FIG. 6 is a schematic block diagram showing a configuration of a command generation device according to a second embodiment.

FIG. 6 is a schematic block diagram showing a configuration of a command generation device according to the second embodiment.

An inverter 32 according to the second embodiment includes an ammeter 322, a voltmeter 323 and a computer 324. The ammeter 322 measures the current at an output end of the inverter 32. The voltmeter 323 measures the bus voltage. The computer 324 generates a control command for the inverter 32 based on the measurement value of the voltmeter 323, and outputs the control command to the inverter 32.

The computer 324 according to the second embodiment includes a control function storage unit 3251, a measurement value acquisition unit 3252, a target frequency determination unit 3253, a target active power determination unit 3254, a target reactive power determination unit 3255, a command generation unit 3256, and a command receiving unit 3257.

The control function storage unit 3251 stores a target frequency function F1 indicating a relationship between the bus voltage and the bus voltage frequency, an active power droop function F2 indicating a relationship between the bus voltage frequency and the active power, and a reactive power droop function F3 indicating a relationship between the bus voltage and the reactive power. The target frequency function F1 is a function in which the bus voltage frequency monotonically increases with respect to the bus voltage. In the present embodiment, "monotonically increase" means that when one value increases, the other value always increases or does not change (monotonically non-decrease). Similarly, "monotonically decrease" means that when one value increases, the other value always decreases or does not change (monotonically non-increase). The target frequency function F1 is a function representing the change of the bus voltage frequency output by the engine power generator 10 with respect to the change of the bus voltage. The active power droop function F2 is a function in which the active power monotonically decreases with respect to the bus voltage frequency. The slope of the active power droop function F2 (the amount of change of the active power with respect to the bus voltage frequency) is the same as the slope relating to the Hz-kW droop characteristic of the governor 13 of the engine power generator 10. The reactive power droop function F3 is a function in which the reactive power monotonically decreases with respect to the bus voltage. The slope of the reactive power droop function F3 (amount of change of the reactive power with respect to the bus voltage) is the same as the slope relating to the V-kVar droop characteristic of the AVR 14 of the engine power generator 10. On the other hand, an intercept of the bus voltage and an intercept of the reactive power in the reactive power droop function F3 are equal to or less than an intercept of the bus voltage and an intercept of the reactive power relating to the V-kVar droop characteristic of the AVR 14 of the engine power generator 10. That is, the reactive power calculated by the reactive power droop function F3 is always equal to or less than the reactive power output by the engine power generator 10 due to the V-kVar droop characteristics of the AVR 14. In the present specification, "the same" and "matching" do not necessarily need to be an exact match, but include a range of substantially matching.

The measurement value acquisition unit 3252 acquires the measurement value from the ammeter 322 and the voltmeter 323.

The target frequency determination unit 3253 determines the target value of the voltage frequency by substituting the measurement value of the bus voltage into the target frequency function F1 stored in the control function storage unit 3251.

The target active power determination unit 3254 determines the target value of the active power by substituting the target value of the voltage frequency determined by the target frequency determination unit 3253 into the active power droop function F2 stored in the control function storage unit 3251.

The target reactive power determination unit 3255 determines the target value of the reactive power by substituting the measurement value of the bus voltage into the reactive power droop function F3 stored in the control function storage unit 3251.

The target frequency determination unit 3253, the target active power determination unit 3254, and the target reactive power determination unit 3255 are examples of the target determination unit.

The command generation unit 3256 generates a control command for the inverter 32 based on the target value of the voltage frequency determined by the target frequency determination unit 3253, the target value of the active power determined by the target active power determination unit 3254, and the target value of the reactive power determined by the target reactive power determination unit 3255.

The command receiving unit 3257 receives a power command from the power control device 40, and updates the active power droop function F2 and the reactive power droop function F3 stored in the control function storage unit 3251 based on the power command. Specifically, the command receiving unit 3257 receives a power command indicating a maximum value of the active power and the reactive power to be output to the electricity storage device 30. The power command is generated based on the power generation capacities of the engine power generator 10 and the solar power generator 20. The command receiving unit 3257 updates the active power droop function F2 such that the intercept value on the active power axis becomes the maximum value of the active power indicated by the power command without changing the slope of the active power droop function F2. In addition, the command receiving unit 3257 updates the reactive power droop function F3 such that the intercept value on the reactive power axis becomes the maximum value of the reactive power indicated by the power command without changing the slope of the reactive power droop function F3.

<<Operation of Inverter>>

Figure 7:
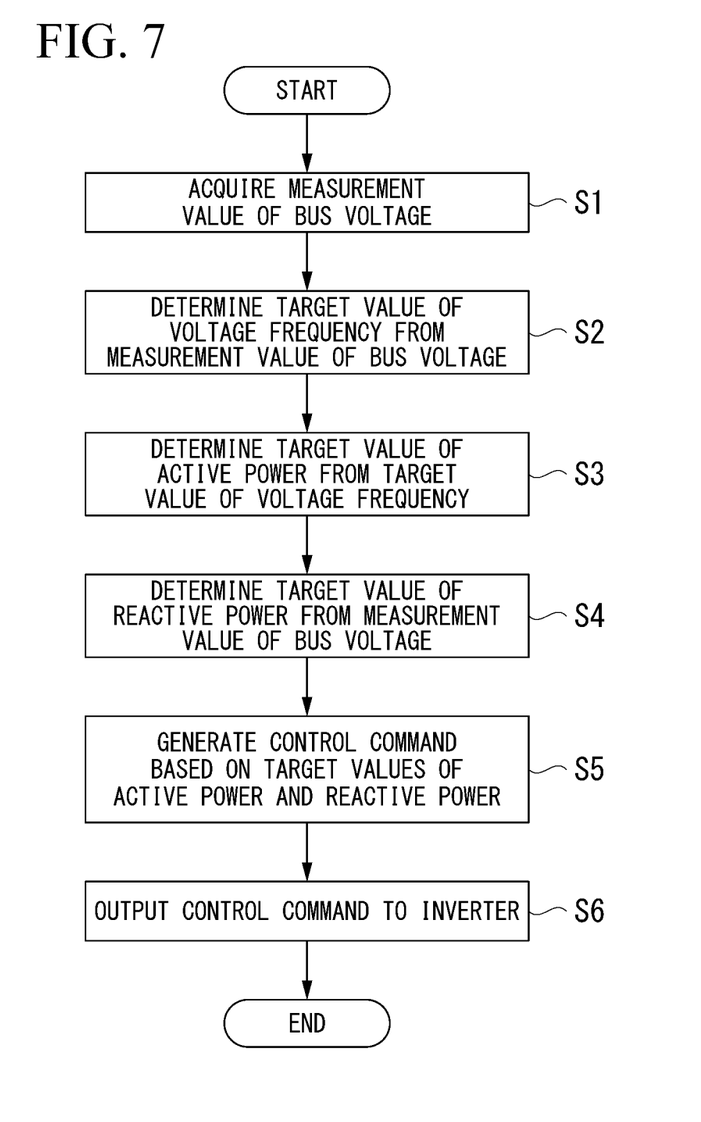
FIG. 7 is a flowchart showing an operation of the inverter of the electricity storage device according to the second embodiment.

FIG. 7 is a flowchart showing an operation of the inverter of the electricity storage device according to the second embodiment.

The measurement value acquisition unit 3252 of the computer 324 acquires the measurement value of the bus voltage from the voltmeter 323 (Step S1). The target frequency determination unit 3253 determines the target value of the voltage frequency by substituting the measurement value of the bus voltage acquired in Step S1 into the target frequency function F1 stored in the control function storage unit 3251 (Step S2). That is, when the bus voltage decreases due to the increase of the load L, the target frequency determination unit 3253 decreases the target frequency. On the other hand, when the bus voltage increases due to the decrease of the load L, the target frequency determination unit 3253 increases the target frequency. As a result, the voltage frequency output by the inverter 32 changes similarly to the voltage frequency output by the engine power generator 10. That is, in the engine power generator 10, as the load L increases, the generated power increases and the voltage frequency decreases; however, the target frequency determination unit 3253 can realize a change in voltage frequency similar to that of the engine power generator 10 by decreasing the target frequency when the bus voltage decreases.

Next, the target active power determination unit 3254 determines the target value of the active power by substituting the target value of the voltage frequency determined in Step S2 into the active power droop function F2 stored in the control function storage unit 3251 (Step S3). The active power droop function F2 has the same slope as the droop characteristics of the engine power generator 10. Therefore, by determining the target value of the active power from the target value of the voltage frequency using the active power droop function F2 in Step S3, the inverter 32 can output the active power according to the droop characteristics of the engine power generator 10. As a result, the active power can be shared by the engine power generator 10 and the electricity storage device 30.

In addition, the target reactive power determination unit 3255 determines the target value of the reactive power by substituting the measurement value of the bus voltage acquired in Step S1 into the reactive power droop function F3 stored in the control function storage unit 3251 (Step S4). The intercept of the bus voltage and the intercept of the reactive power in the reactive power droop function F3 are equal to or less than the intercept of the bus voltage and the intercept of the reactive power relating to the V-kVar droop characteristics of the AVR 14 of the engine power generator 10. That is, the reactive power calculated by the reactive power droop function F3 is always equal to or less than the reactive power output by the engine power generator 10 due to the V-kVar droop characteristics of the AVR 14. As a result, the reactive power can be shared by the engine power generator 10 and the electricity storage device 30, and a relatively large amount of reactive power can be shared to the engine power generator 10 having a power factor lower than that of the inverter 32.

The command generation unit 3256 generates the control command for the inverter 32 based on the target value of the active power determined in Step S3 and the target value of the reactive power determined in Step S4 (Step S5). The command generation unit 3256 outputs the generated control command to the inverter 32 (Step S6). As a result, the inverter 32 can output the power at the target value of the active power determined in Step S3 and the target value of the reactive power determined in Step S4.

<<Action and Effects>>

As described above, the command generation device 33 according to the second embodiment determines the target value of the voltage frequency and the target value of the active power based on the voltage value of the bus. At this time, the target value of the voltage frequency increases as the bus voltage increases, and the target value of the active power decreases. As a result, the voltage frequency and active power of the electricity storage device 30 can be changed without delay with respect to the fluctuation of the engine power generator 10 operated by the droop characteristics. Therefore, according to the command generation device 33, in the power supply system 1 including the engine power generator 10 which is an AC power generator and the electricity storage device 30 which is a DC power supply device, the fluctuation of the load L can be shared by each of the engine power generator 10 and the electricity storage device 30.

The command generation device 33 according to the second embodiment is provided separately from the inverter 32. As a result, by installing the command generation device 33 in the existing electricity storage device 30, it is possible to prevent the electricity storage device 30 from being disconnected without modifying the inverter 32.

In addition, the command generation device 33 according to the second embodiment determines the target value of the active power based on the active power droop function F2 indicating the relationship in which the active power monotonically decreases with respect to the voltage frequency. The amount of change of active power with respect to the voltage frequency in the active power droop function F2 matches the active power droop characteristics of the engine power generator 10. As a result, the command generation device 33 can change the active power output by the inverter 32 in accordance with the droop characteristics of the engine power generator 10.

In other embodiments, the present invention is not limited to this. For example, the amount of change of active power with respect to the voltage frequency in the active power droop function F2 of the command generation device 33 according to other embodiments may not need to match that in the active power droop characteristics of the engine power generator 10. In addition, the command generation device 33 according to other embodiments may determine the active power from the measurement value of the bus voltage by using a function indicating a relationship in which the active power monotonically decreases with respect to the bus voltage, instead of the active power droop function F2.

In addition, the command generation device 33 according to the second embodiment determines the target value of the reactive power based on the bus voltage. As a result, the inverter 32 can make the reactive power generated by the fluctuation of the load L be shared by each of the engine power generator 10 and the electricity storage device 30. In addition, the command generation device 33 according to the second embodiment determines the target value of the reactive power based on the reactive power droop function F3 indicating the relationship in which the reactive power monotonically decreases with respect to the voltage value. The intercept of the voltage value and the intercept of the reactive power in the reactive power droop function F3 are equal to or less than the intercept of the voltage value and the intercept of the reactive power in the reactive power droop characteristics of the engine power generator 10. As a result, the command generation device 33 can make the reactive power be shared by the engine power generator 10 and the electricity storage device 30, and make a relatively large amount of reactive power be shared to the engine power generator 10 having a power factor lower than that of the inverter 32. Other embodiments are not limited to this. For example, the command generation device 33 according to other embodiments may perform the control such that only the active power is shared to the inverter 32 without the reactive power.

In the second embodiment, the inverter 32 of the electricity storage device 30 performs the above-described control, but other embodiments are not limited to this. For example, in other embodiments, the inverter 22 of the solar power generator 20 may perform the same control. In addition, in other embodiments, the above-described control may be performed on a some of the inverters 32 among the plurality of inverters 32, and the normal control may be performed on the other inverters 32 among the plurality of inverters 32.

<Configuration of Computer>

Figure 8:
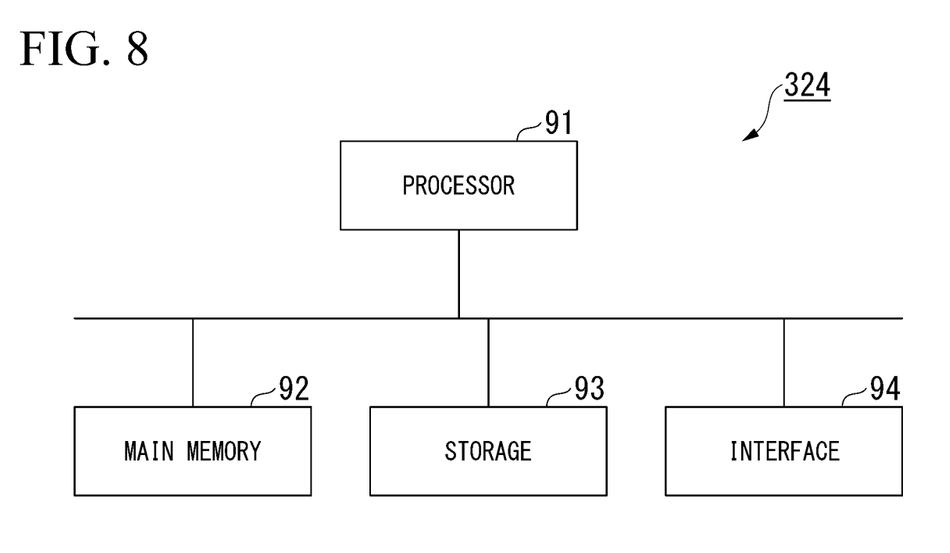
FIG. 8 is a schematic block diagram showing a configuration of a computer according to at least one embodiment.

FIG. 8 is a schematic block diagram showing a configuration of a computer according to at least one embodiment.

A computer 324 according to at least one embodiment described above includes a processor 91, a main memory 92, a storage 93, and an interface 94. The operation of each processing unit described above is stored in the storage 93 in a form of a program. The processor 91 reads the program from the storage 93, loads the program into the main memory 92, and executes the above-described processing according to the program. In addition, the processor 91 secures a storage area corresponding to the above-described control function storage unit 3251 in the main memory 92 according to the program.

The program may realize a part of the functions that are performed by the computer 324. For example, the program may perform the functions in combination with another program already stored in the storage 93 or in combination with another program mounted on another device. In other embodiments, the computer 324 may include a custom large scale integrated circuit (LSI) such as a programmable logic device (PLD) in addition to or instead of the configuration described above. Examples of the PLDs include a programmable array logic (PAL), a generic array logic (GAL), a complex programmable logic device (CPLD), and a field programmable gate array (FPGA). In this case, all or a part of the functions realized by the processor 91 may be realized by the integrated circuit.

Examples of the storage 93 include a hard disk drive (HDD), a solid state drive (SSD), a magnetic disk, an optical magnetic disk, a compact disc read only memory (CD-ROM), a digital versatile disc read only memory (DVD-ROM), a semiconductor memory, and the like. The storage 93 may be the internal media directly connected to the bus of the computer 324, or the external media connected to the computer 324 via the interface 94 or a communication line. Also, if the program is distributed to the computer 324 via a communication line, the computer 324 that received the distribution may load the program into the main memory 92 to execute the processing described above. In at least one embodiment, the storage 93 is a non-temporary tangible storage medium.

In addition, the program may realize a part of the functions described above. Furthermore, the program may be a so-called difference file (difference program) that realizes the functions described above in combination with another program already stored in the storage 93.

As above, one embodiment is described in detail with reference to the drawings, however, the specific configuration is not limited to the above description, and various design changes and the like can be made.

INDUSTRIAL APPLICABILITY

According to the present invention, a command generation device according to at least one of the above-described aspects can control an inverter such that the fluctuation of the load is shared by each of the AC power generator and the DC power supply device in the power supply system including the AC power generator and the DC power supply device.

REFERENCE SIGNS LIST

1: power supply system
10: engine power generator
11: engine
12: power generator
13: governor
14: AVR
20: solar power generator
21: solar cell
22: inverter
30: electricity storage device
31: secondary battery
32: inverter
33: command generation device
322: ammeter
323: voltmeter
324: computer
3241: model storage unit
3242: command receiving unit
3243: measurement value acquisition unit
3244: field voltage calculation unit
3245: drive torque calculation unit
3246: rotation calculation unit
3247: target determination unit
3248: command generation unit
3251: control function storage unit
3252: measurement value acquisition unit
3253: target frequency determination unit
3254: target active power determination unit
3255: target reactive power determination unit
3256: command generation unit
3257: command receiving unit
40: power control device

What is claimed is:

1. A command generation device that generates a control command for an inverter of a DC power supply device, the inverter is controlled according to the control command that includes a target value of an active power, a target value of a reactive power, and a target value of a voltage frequency, and converts DC power into AC power, and the DC power supply device is connected to the same bus as that of an AC power generate that supplies electric power by an off grid independent operation, the command generation device being provided separately from a device, including the inverter connected to the DC power supply device, the command generation device comprising:

a rotation calculation unit configured to calculate, based on a rotor model and the active power command, a value relating to a rotation of a rotor of a virtual power generator when the virtual power generator is driven according to the active power command, wherein the rotor model is configured to simulate a driving of the virtual power generator and to calculate a value relating to the rotation of the rotor of the virtual power generator;

a target determination unit configured to determine the target value of the voltage frequency and the target value of the active power based on the calculated value relating to the rotation; and a command generation unit configured to generate and output, to the inverter, the control command for the inverter including the determined target value of the voltage frequency and the target value of the active power, wherein a time constant relating to a synchronization power of the rotor model is configured to match a time constant relating to a synchronization power of the AC power generator.

2. The command generation device according to claim 1, further comprising:

a drive torque calculation unit configured to calculate a value relating to a drive torque of the virtual power generator by inputting the voltage frequency of the bus, the frequency command for the inverter, and the active power command into a governor model, wherein the governor model is configured to determine a value relating to the drive torque of the virtual power generator based on the active voltage of the bus, the frequency command, and the active power command, wherein the rotation calculation unit is configured to calculate the value relating to the rotation of the virtual power generator based on the calculated value relating to the drive torque and the rotor model.

3. The command generation device according to claim 2, wherein a time constant relating to a droop filter of the governor model matches a time constant relating to the droop filter of a governor of the AC power generator.

4. The command generation device according to claim 1, further comprising:

a field voltage calculation unit configured to calculate a value relating to a field voltage of the virtual power generator by inputting the bus voltage and reactive power command for the inverter into an automatic voltage regulator model, wherein the automatic voltage regulator model is configured to determine a value relating to the field voltage of the virtual power generator based on the bus voltage and the reactive power command, wherein the target determination unit is configured to determine the target value of the active power and a target value reactive power based on the calculated value relating to the rotation and the value relating to the field voltage.

5. The command generation device according to claim 1, wherein the inverter is a general-purpose inverter operated according to a control command relating to P-Q control.

6. A command generation device that generates a control command for an inverter of a DC power supply device, wherein the inverter is controlled according to the control command that includes a target value of an active power, a target value of a reactive power, and a target value of a voltage frequency, and converts DC power into AC power, and the DC power supply device is connected to a same bus as that of an AC power generator that supplies electric power by an off grid independent operation, the command generation device being provided separately from a device including the inverter connected to the DC power supply device, the command generation device comprising:

a target determination unit configured to determine the target value of the active power based on a voltage value of the bus, wherein the target value of the active power decreases monotonically with respect to a voltage value; and a command generation unit configured to generate and output, to the inverter, the control command for the inverter including the determined target value of the active power.

7. The command generation device according to claim 6, wherein the target determination unit is configured to determine a target value of a voltage frequency that increases monotonically with respect to the voltage value, and determine the target value of the active power based on an active power droop function and the determined target value of the voltage frequency, the active power droop function indicating a relationship in which the active power monotonically decreases with respect to the voltage frequency.

8. The command generation device according to claim 7, wherein an amount of change of the active power with respect to the voltage frequency in the active power droop function matches active power droop characteristics of the AC power generator.

9. The command generation device according to claim 6, wherein the target determination unit is configured to determine the target value of the reactive power that monotonically decreases with respect to the voltage value based on the voltage value of the bus, and the command generation unit is configured to generate a control command for the inverter based on the determined target value of the active power and the target value of the reactive power.

10. The command generation device according to claim 9, wherein the target determination unit is configured to determine the target value of the reactive power based on a reactive power droop function indicating a relationship in which the reactive power monotonically decreases with respect to the voltage value and the determined voltage value of the bus.

11. The command generation device according to claim 10, wherein an intercept of the voltage value and an intercept of the reactive power in the reactive power droop function are equal to or less than an intercept of the voltage value and an intercept of the reactive power in the reactive power droop characteristics of the AC power generator.

12. A command generation method of generating a control command for an inverter of a DC power supply device, wherein the inverter is controlled according to the control command that include a target value of an active power, a target value of a reactive power, and a target value of a voltage frequency, and converts DC power into AC power, and the DC power supply device is connected to a same bus as that of an AC power generator that supplies electric power by an off grid independent operation, the method is performed in a computer that is provided separately from a device including the inverter connected to the DC power supply device, the method comprising:

a step of calculating, based on a rotor model and an active power command, a value relating to a rotation of a rotor of a virtual power generator when the virtual power generator is driven according to the active power command, wherein the rotor model is configured to simulate a driving of the virtual power generator and to calculate a value relating to the rotation of the rotor of the virtual power generator;

a step of determining the target value of the voltage frequency and the target value of the active power based on the calculated value relating to the rotation; and a step of generating and outputting, to the inverter, the control command for the inverter including the determined target value of the voltage frequency and the target value of the active power, wherein a time constant relating to a synchronization power of the rotor model matches a time constant relating to a synchronization power of the AC power generator.

13. A command generation method of generating a control command for an inverter of DC power supply device, wherein the inverter is controlled according to the control command that includes a target value of an active power, a target value of a reactive power, and a target value of a voltage frequency, and converts DC power into AC power, and the DC power supply device is being connected to a same bus as that of an AC power generator that supplies electric power by an off grid independent operation, the method is performed in a computer that is provided separately from a device including the inverter connected to the DC power supply device, the method comprising:

a step of determining the target value of the active power that decreases monotonically with respect to the voltage value based on the voltage value of the bus; and a step of generating and outputting, to the inverter the control command for the inverter including the determined target value of the active power.

* * * * *